United States Patent
Rumer et al.

(10) Patent No.: US 6,526,211 B2
(45) Date of Patent: Feb. 25, 2003

(54) FREE SPACE OPTICAL "BACKPLANE" (FSO)

(75) Inventors: Mark Rumer, Santa Barbara, CA (US); Ronald Jeffries, Arroyo Grande, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 09/844,896

(22) Filed: Apr. 26, 2001

(65) Prior Publication Data

US 2002/0159742 A1 Oct. 31, 2002

(51) Int. Cl.[7] .................................................. G02B 6/00
(52) U.S. Cl. ...................................................... 385/134
(58) Field of Search ................................. 385/134, 135, 385/136, 137, 14, 15, 88, 89, 139; 358/335, 132

(56) References Cited

U.S. PATENT DOCUMENTS

| | | | | |
|---|---|---|---|---|
| 4,121,249 A | * | 10/1978 | Lemelson | 358/132 |
| 4,288,825 A | * | 9/1981 | Hasuo et al. | 360/88 |
| 4,398,223 A | * | 8/1983 | Lamelson | 358/355 |
| 4,434,510 A | * | 2/1984 | Lamelson | 455/603 |
| 4,511,930 A | * | 4/1985 | Lemelson | 358/355 |

\* cited by examiner

Primary Examiner—Lynn D. Feild
Assistant Examiner—J. F. Duverne
(74) Attorney, Agent, or Firm—Blakely Sokoloff Taylor & Zafman LLP

(57) ABSTRACT

A system having a free space optical transmission capability for data and/or control interconnection is described. Switch cards, having corresponding pairs of laser transmitters and photodetectors are placed in a chassis, at each end, facing each other. Each laser transmitter/photodetector (LTPD) pair of one switch card is targeted to a corresponding photodetector/laser transmitter (PDLT) pair of the other. System line cards have a LTPD pair on one side and a PDLT pair on the other side. A line card is positioned in the chassis so that the LTPD pair is aligned with a corresponding PDLT pair on one switch card and the PDLT pair is aligned with a corresponding LTPD pair on the other switch card. The line card may, therefore, communicate with either switch card. The line cards contain apertures so that communication between other line cards and the switch cards is not obstructed.

14 Claims, 5 Drawing Sheets

FREE SPACE OPTICAL "BACKPLANE" (FSO)

FIELD OF THE INVENTION

This invention relates generally to backplane system architecture, and more specifically to a free space optical backplane configuration.

BACKGROUND OF THE INVENTION

A communications system backplane provides a common bus having sockets through which switch cards and line cards may be connected to the other parts of the system. Typical wired backplanes use a particular type of architecture such as Asynchronous Transfer Mode (ATM), Internet Prototcol (IP), or other types of packet-based architecture. The drawback of such a scheme is that the particular bandwidth is set. Recent improvements in backplane architecture include the implementation of an optical backplane. An optical backplane has the advantage of providing much higher bandwidth capacity. An optical backplane can be implemented having scalable bandwidth and can take advantage of technologies such a dense wave division multiplexing (DWDM) to increase bandwidth and add flexibility to the system. Additionally, faster optical interfaces are being developed.

A disadvantage to typical optical backplanes is the amount of space they take up within the chassis. FIG. 1 illustrates the configuration of two cards, within a chassis, optically connected according to the prior art. The system 100 shown in FIG. 1 has two, for example, line cards 102a and 102b. Line cards 102a and 102b each have a laser transceiver 104a and 104b, respectively. Attached to laser transceiver 104a is a length of optical fiber known as a "pigtail" 106a. Pigtail 106a couples the laser transceiver 104a to a transition connector 108a that is coupled to a bulkhead 110a and likewise to another transition connector 112a. This interconnecting hardware takes up a great deal of space within the chassis. Transition connector 112a is connected to transition connector 112b via transmission fiber 114. Transmission fiber 114 has a bend radius associated with it that is typically measured in inches. Transition connector 112b is coupled to bulkhead 110b and likewise to another transition connector 108b. Accommodating an optically interconnected backplane requires an excessive amount of the area of the card as well as the chassis. For example, the interconnecting hardware, together with the bend radius of the transmission fiber, requires from 2.5 to 3 inches of chassis space in a system typically having a 12-inch chassis.

SUMMARY OF THE INVENTION

A system allowing free-space optical data transmission is disclosed. The system is has a chassis having a plurality of card slots with at least one switch card having a plurality of switch card laser transmitters and a plurality of switch card photodetectors, inserted into a card slot. The system has at least one feature card having a feature card laser transmitter and a feature card photodetector, inserted into a card slot. The system has an alignment mechanism to align the at least one feature card such that the feature card laser transmitter aligns with a specified switch card photodetector and the feature card photodetector aligns with a specified switch card laser transmitter. The system also has a free-space optical data transmission path such that the feature card laser transmitter can transmit a signal to the specified switch card photodetector and the specified switch card laser transmitter can transmit a signal to the feature card photodetector.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A system having a free space optical transmission capability for data and/or control interconnection is described. Switch cards, having corresponding pairs of laser transmitters and photodetectors are placed in a chassis, at each end, facing each other. Each laser transmitter/photodetector (LTPD) pair of one switch card is targeted to a corresponding photodetector/laser transmitter (PDLT) pair of the other. System line cards have a LTPD pair on one side and a PDLT pair on the other side. A line card is positioned in the chassis so that the LTPD pair is aligned with a corresponding PDLT pair on one switch card and the PDLT pair is aligned with a corresponding LTPD pair on the other switch card. The line card may, therefore, communicate with either switch card. The line cards contain apertures so that communication between other line cards and the switch cards is not obstructed. If no line card is positioned corresponding to a particular LTPD pair on one switch card, the LTPD may communicate with the corresponding PDLT on the other switch card. Through this communication the switch cards may conduct self-tests.

An intended advantage of the present invention is reduce the space required to implement an optical backplane. Another intended advantage is to reduce the interconnective hardware in an optical backplane. Another intended advantage is to allow a switch card to conduct self-tests of unpopulated chassis slots. Another intended advantage is to provide a redundant communication path between a line card and a switch card.

Figure 1:
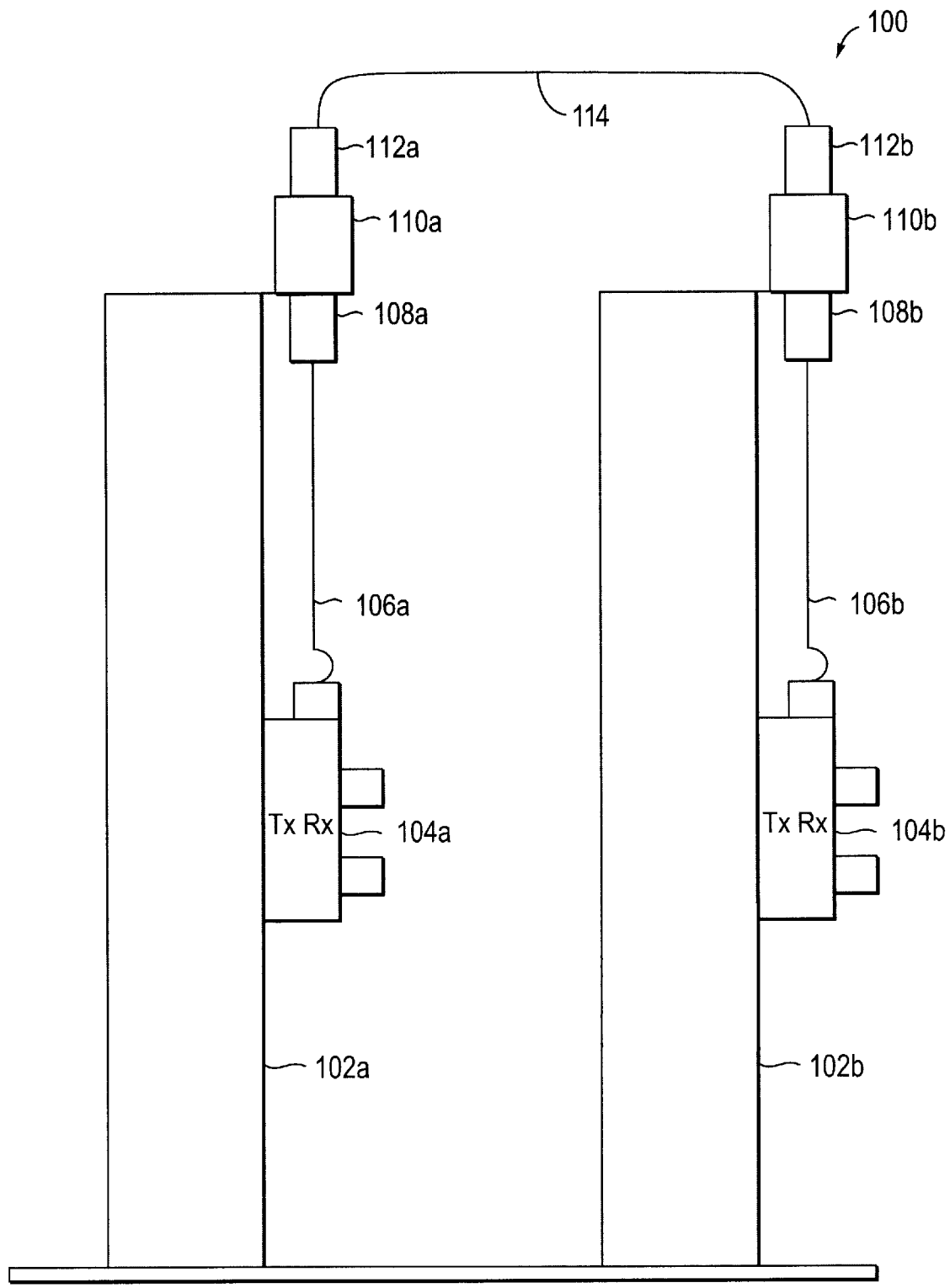
FIG. 1 illustrates the configuration of two cards, within a chassis, optically connected according to the prior art.
Figure 2:
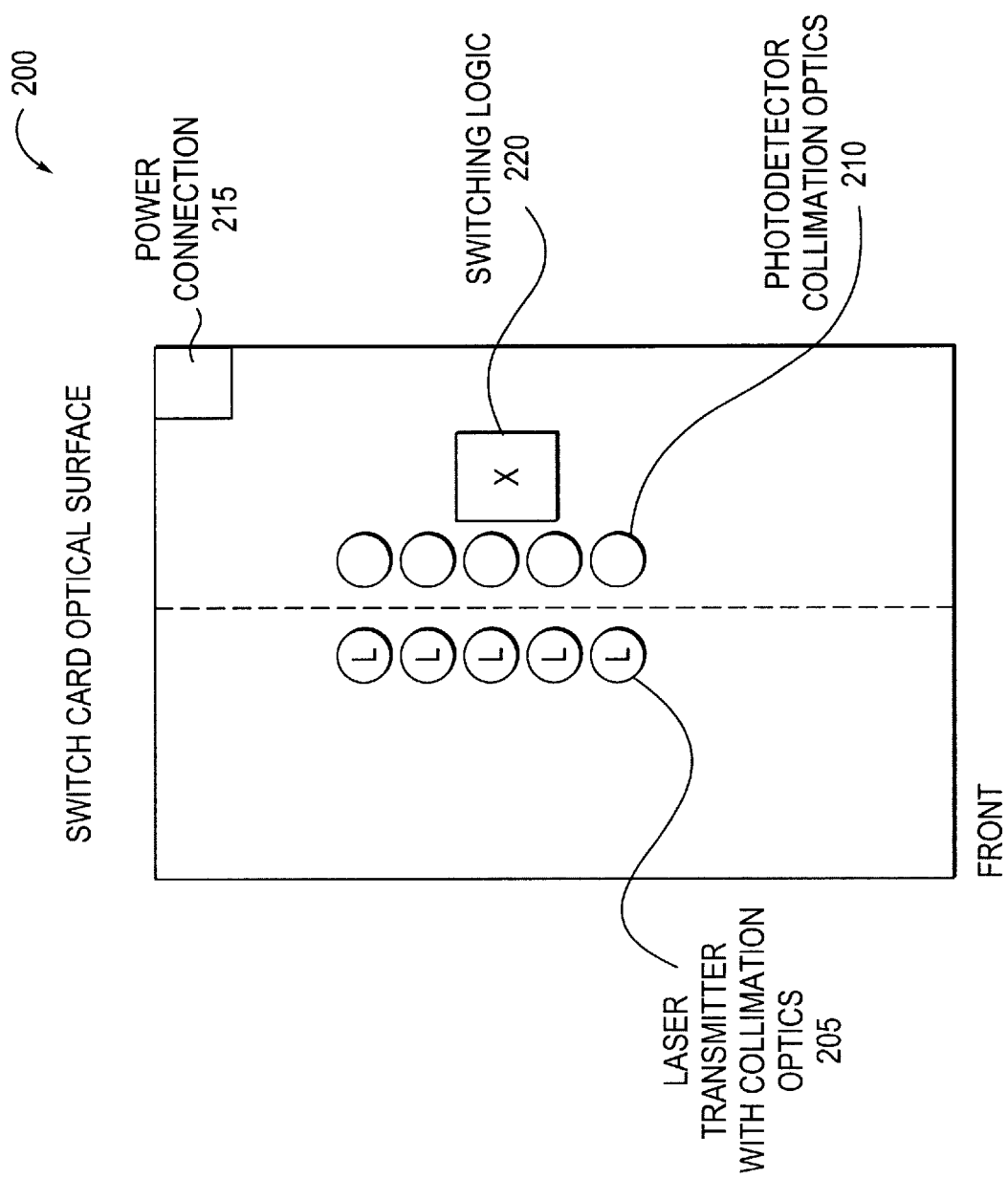
FIG. 2 illustrates an exemplary switch card in accordance with one embodiment of the present invention.

FIG. 2 illustrates an exemplary switch card in accordance with one embodiment of the present invention. In one embodiment the switch card 200 may be a rectangular card that may plug into a backplane. The backplane may supply power to the card. The switch card 200, shown in FIG. 2 includes a group of laser transmitters 205. Laser transmitters 205 are mounted perpendicular to the plane of the switch card 200 so that the transmitted light beam is perpendicular to the plane of the switch card 200. Each laser transmitter 205 has associated collimation optics. Switch card 200 also includes a group of photodetectors 210 each of which is paired with a laser transmitter 205 to form a LTPD pair. Each photodetector 210 also has associated collimation optics. Switch card 200 also may include power connector 215 and switching logic 220.

In one embodiment switch card 200 may be seated at one end of a chassis. Laser transmitters 205 would send collimated light beams across the chassis. At the opposite end of the chassis may typically be another switch card 200', facing the opposite direction and configured so that its photodetectors are aligned in depth, within the chassis, with the laser transmitters 205 of switch card 200 and its laser transmitters are aligned in depth, with the photodetectors 210 of switch card 200. That is, switch card 200 contains a series of LTPD pairs that are aligned with a series of PDLT pairs contained on switchcard 200.

Figure 3:
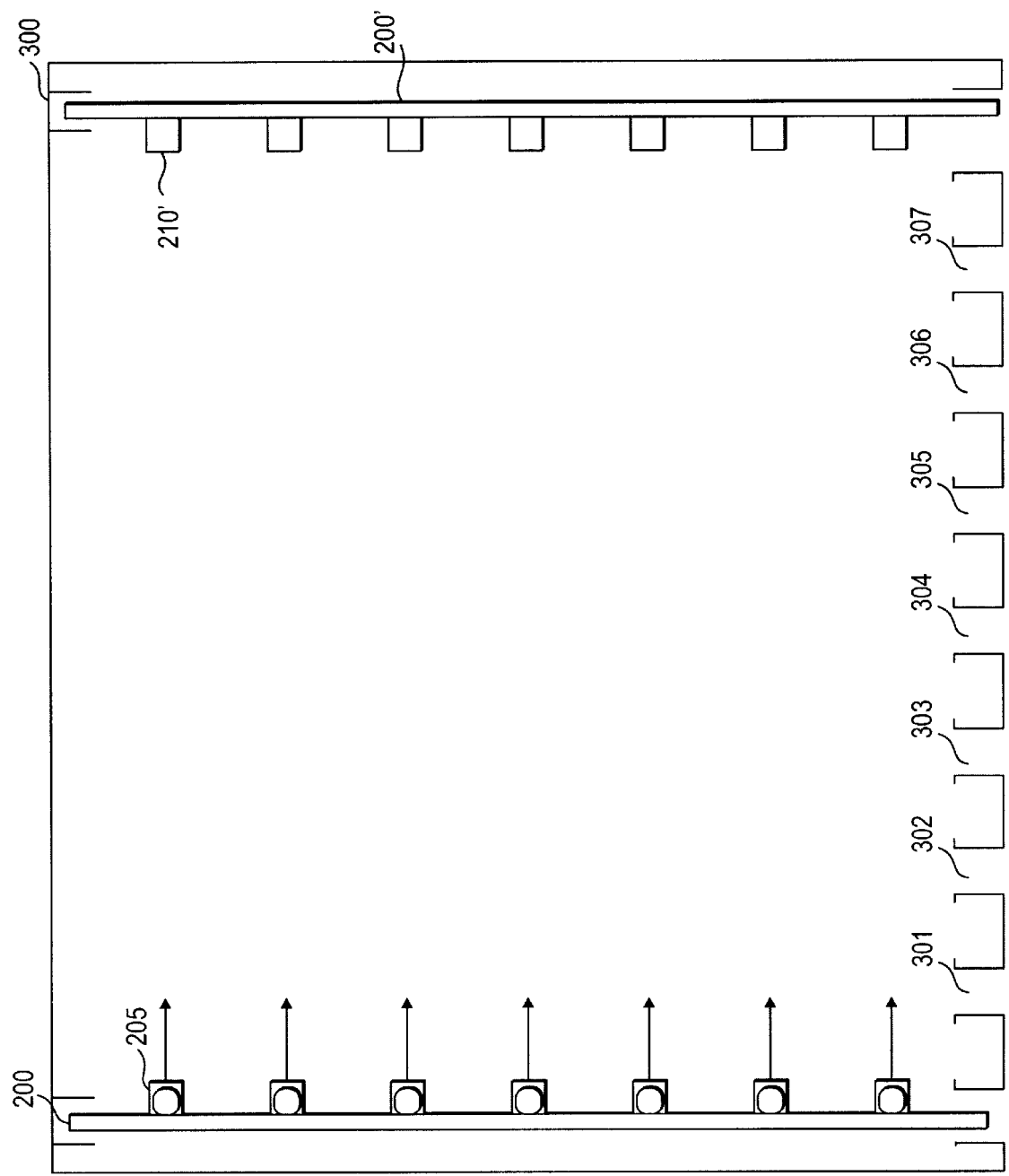
FIG. 3 illustrates a top view of a chassis having a switch card inserted at each end in accordance with one embodiment of the present invention.

FIG. 3 illustrates a top view of a chassis having a switch card inserted at each end in accordance with one embodiment of the present invention. Chassis 300 has switch card 200 inserted at one end and switch card 200' inserted at the other end. Chassis 300 includes feature card slots 301 through 307 located between switch card 200 and switch card 200'. Feature card slots 301 through 307 are unpopulated. Switch card 200 has laser transmitters 205 that are transmitting beams of light and switch card 200' has photodetectors 210' that are receiving the transmitted light beams from laser transmitters 205. The collimation optics associated with each laser transmitter and each photodetector ensure the beam is wide enough to hit its target without being so wide that it extends to adjacent slots. Typical collimation optics can operate thusly over a distance of 18 to 24 inches.

Switch card 200 also has photodetectors, not shown, that receive transmitted beams of light from laser transmitters, not shown, located on switch card 200'. When a feature card slot is unpopulated it allows the switch cards 200 and 200' to communicate with each other and determine if that slot interface is functioning properly.

Figure 4:
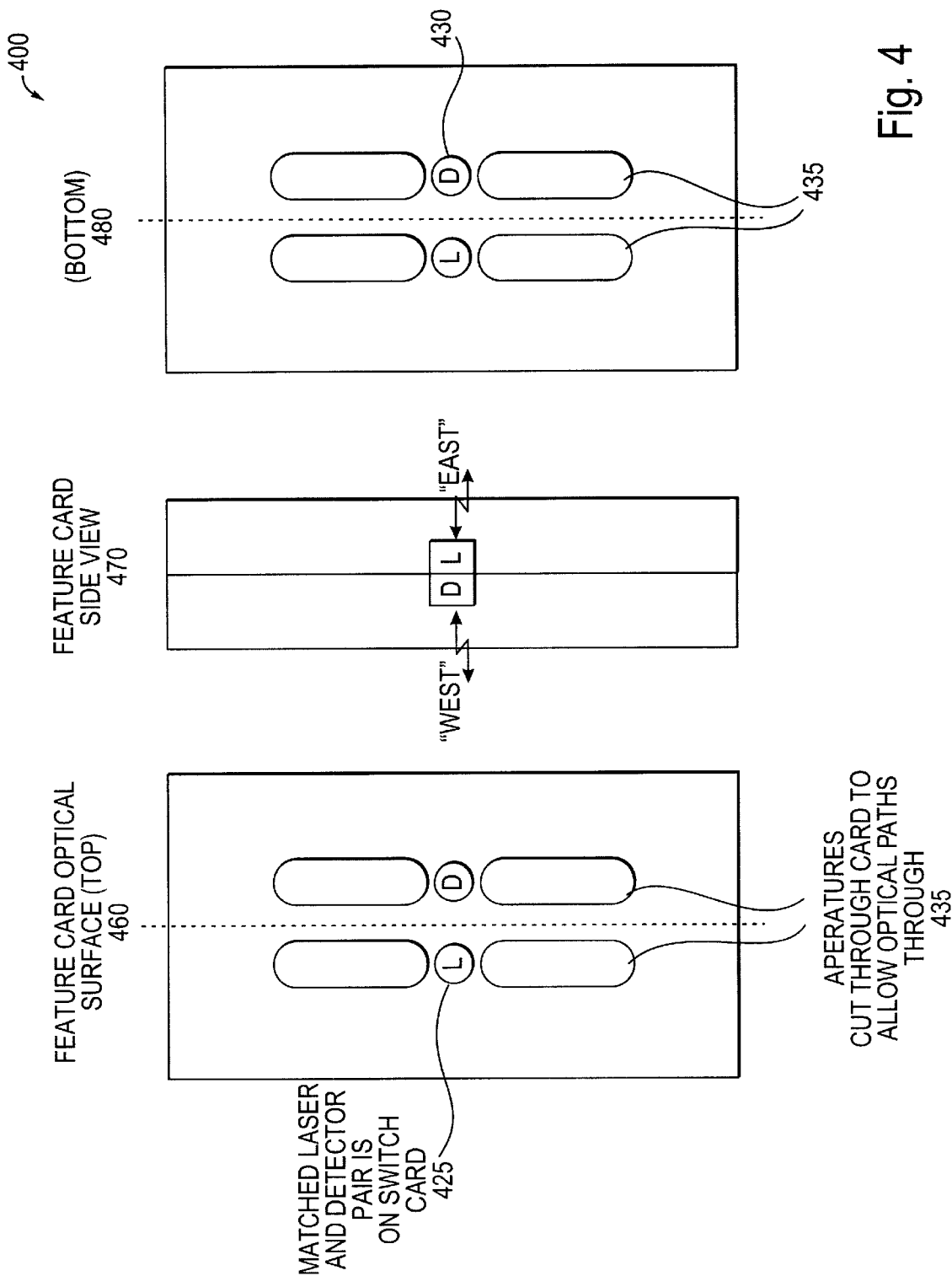
FIG. 4 illustrates three views of an exemplary feature card in accordance with one embodiment of the present invention.

FIG. 4 illustrates three views of an exemplary feature card in accordance with one embodiment. As shown in top view 460, feature card 400 has, at top-center, a LTPD pair 425 configured like one of the LTPD pairs of switch card 200. As shown in bottom view 480, feature card 400 has at bottom-center, a PDLT pair configured like one of the PDLT pairs of switch card 200'. That is, behind the laser transmitter is a photodetector, and behind the photodetector is a laser transmitter. From the side, as shown in side view 470, the top-mounted photodetector will be visible along with the bottom-mounted laser transmitter. With this configuration, feature card 400 may be inserted into a specific position in the chassis so that its PDLT pair 425 is aligned, in depth, with a LTPD pair of switch card 200 and its LTPD pair is aligned, in depth, with the corresponding PDLT pair of switch card 200'. This will allow feature card 400 to communicate with either switch card.

As shown in top view 460 and bottom view 480, feature card 400 has apertures 435 that serve as optical paths to allow beams of light, not intended for a particular feature card, to pass through the feature card. This allows other feature cards to be inserted into the chassis so that their PDLT pairs are aligned, in depth, with other LTPD pairs of switch card 200 and their LTPD pairs are aligned, in depth, with corresponding PDLT pairs of switch card 200'. The apertures allow beams of light, not intended for a given card to pass through the card unobstructed. This allows each feature card to communicate with either switch cord. In an alternative embodiment the apertures may extend to the end of the line card.

Figure 5:
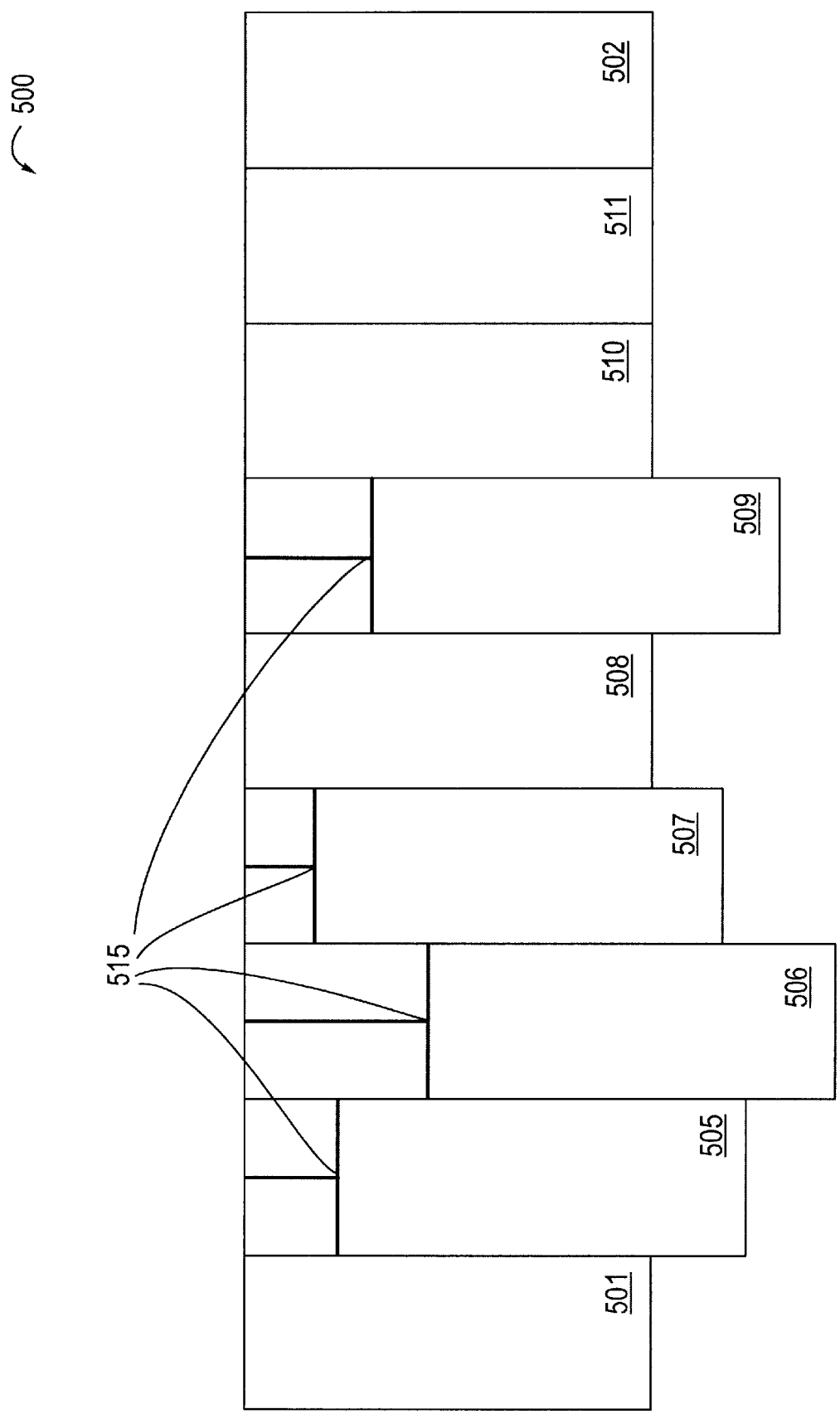
FIG. 5 illustrates an exemplary configuration of a chassis according to one embodiment of the present invention.

FIG. 5 illustrates an exemplary configuration of a chassis according to one embodiment of the present invention. The chassis 500 shown in FIG. 5 has a switch card 501 at one end and a switch card 502 at the other end as described above in reference to FIG. 3. Chassis 500 also has a group of feature cards 505 through 509 and unpopulated slots 510 and 511. Feature cards 505 through 509 are staggered, in depth, within the chassis 500 by use of card stops 515. Card stops 515 are placed at staggered positions within the chassis slots so that a feature card inserted into a particular slot may only be inserted to a specified depth. In one embodiment the chassis is fabricated to control the card insertion angle and insertion depth so that typical collimation optics may allow a light beam to hit a target of 0.2 inches in diameter from a range of 18 inches.

As can be discerned from the top view, the feature cards are staggered in depth so that the PDLT pair of each feature card will align with an LTPD pair of switch card 501 and the LTPD pair of each feature card will align with a corresponding PDLT pair of switch card 502. The alignment mechanism, by which the feature cards are properly aligned within the chassis, may be an element of the chassis or an element of the feature card itself. In one embodiment the staggering of feature cards may be accomplished by placing card stops within the chassis slots as described above. In an alternative embodiment the card stops may be placed on the feature cards. In an alternative embodiment the mounting position of the LTPD pairs and PDLT pairs on the feature card may be selectable based upon which chassis slot the feature card will be inserted into. In an alternative embodiment, a group of, for example, eight feature cards may be fabricated so that the LTPD pairs and PDLT pairs of each is mounted in a different position on the feature card.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A system comprising:
    a chassis having a plurality of card slots;
    at least one switch card having a plurality of switch card laser transmitter/photodetector pairs, each switch card laser transmitter/photodetector pair comprising a switch card laser transmitter and a switch card photodetector, the switch card inserted into a card slot;
    at least one feature card having a feature card laser transmitter/photodetector pair, the laser transmitter/photodetector pair comprising a feature card laser transmitter and a feature card photodetector, the at least one feature card inserted into a card slot, the at least one feature card contains apertures such that one of the at least one feature cards will not obstruct the free-space optical data transmission path of the other at least one feature cards;
    an alignment mechanism to align the at least one feature card such that the feature card laser transmitter aligns with a specified switch card photodetector and the feature card photodetector aligns with a specified switch card laser transmitter; and
    a plurality of free-space optical data transmission paths such that the feature card laser transmitter can transmit a signal to the specified switch card photodetector and the specified switch card laser transmitter can transmit a signal to the feature card photodetector.

2. The system of claim 1 wherein the laser transmitters and the photodetectors have associated collimation optics.

3. The system of claim 1 wherein the free-space optical data transmission path is used to communicate such that a self-test of a slot interface is accomplished.

4. A system comprising:

a chassis having a plurality of card slots;

at least one switch card having a plurality of switch card laser transmitter/photodetector pairs, each switch card laser transmitter/photodetector pair comprising a switch card laser transmitter and a switch card photodetector, the switch card inserted into a card slot;

at least one feature card having a feature card laser transmitter/photodetector pair, the laser transmitter/photodetector pair comprising a feature card laser transmitter and a feature card photodetector, the at least one feature card inserted into a card slot;

a plurality of card stops to align the at least one feature card such that the feature card laser transmitter aligns with a specified switch card photodetector and the feature card photodetector aligns with a specified switch card laser transmitter; and a plurality of free-space optical data transmission paths such that the feature card laser transmitter can transmit a signal to the specified switch card photodetector and the specified switch card laser transmitter can transmit a signal to the feature card photodetector.

5. The system of claim 4 wherein the card stops positioned within the card slots such that each slot allows a feature cards to be inserted a different distance.

6. The system of claim 4 wherein the card stops positioned on the feature cards such that each feature card may be inserted a different distance.

7. The system of claim 4 wherein the laser transmitters and the photodetectors have associated collimation optics.

8. The system of claim 4 wherein the free-space optical data transmission path is used to communicate such that a self-test of a slot interface is accomplished.

9. A system comprising:

a chassis having a plurality of card slots;

at least one switch card having a plurality of switch card laser transmitter/photodetector pairs, each switch card laser transmitter/photodetector pair comprising a switch card laser transmitter and a switch card photodetector, the switch card inserted into a card slot;

at least one feature card having a feature card laser transmitter/photodetector pair, the laser transmitter/photodetector pair comprising a feature card laser transmitter and a feature card photodetector, the at least one feature card inserted into a card slot;

an alignment mechanism to align the at least one feature card such that the feature card laser transmitter aligns with a specified switch card photodetector and the feature card photodetector aligns with a specified switch card laser transmitter; and a plurality of free-space optical data transmission paths such that the feature card laser transmitter can transmit a signal to the specified switch card photodetector and the specified switch card laser transmitter can transmit a signal to the feature card photodetector;

wherein the switch card laser transmitter/photodetector pair of one of the at least one switch cards has a free-space optical data transmission path to an inverted switch card laser transmitter/photodetector pair of another one of the at least one switch cards due to an unpopulated card slot.

10. The system of claim 9 wherein the laser transmitters and the photodetectors have associated collimation optics.

11. The system of claim 9 wherein the free-space optical data transmission path is used to communicate such that a self-test of a slot interface is accomplished.

12. A system comprising:

a chassis having a plurality of card slots;

at least one switch card having a plurality of switch card laser transmitter/photodetector pairs, each switch card laser transmitter/photodetector pair comprising a switch card laser transmitter and a switch card photodetector, the switch card inserted into a card slot;

at least one feature card having a feature card laser transmitter/photodetector pair, the laser transmitter/photodetector pair comprising a feature card laser transmitter and a feature card photodetector, the at least one feature card inserted into a card slot, the at least one feature card has an inverted feature card laser transmitter/photodetector pair, opposite the feature card laser transmitter/photodetector pair for redundant data transmission;

an alignment mechanism to align the at least one feature card such that the feature card laser transmitter aligns with a specified switch card photodetector and the feature card photodetector aligns with a specified switch card laser transmitter; and a plurality of free-space optical data transmission paths such that the feature card laser transmitter can transmit a signal to the specified switch card photodetector and the specified switch card laser transmitter can transmit a signal to the feature card photodetector.

13. The system of claim 12 wherein the laser transmitters and the photodetectors have associated collimation optics.

14. The system of claim 12 wherein the free-space optical data transmission path is used to communicate such that a self-test of a slot interface is accomplished.

* * * * *